(12) United States Patent
Duffin

(10) Patent No.: US 6,201,214 B1
(45) Date of Patent: Mar. 13, 2001

(54) LASER DRILLING WITH OPTICAL FEEDBACK

(75) Inventor: Jason E. Duffin, Leicestershire (GB)

(73) Assignee: M. J. Technologies, Limited, Leicestershire (GB)

( * ) Notice: Subject to any disclaimer, the term of this patent is extended or adjusted under 35 U.S.C. 154(b) by 0 days.

(21) Appl. No.: 09/295,116

(22) Filed: Apr. 19, 1999

(51) Int. Cl.[7] ............................ B23K 26/00; B23K 26/02; B23K 26/04; B23K 26/08; B23K 26/10
(52) U.S. Cl. ............................. 219/121.71; 219/121.66; 219/121.72; 219/121.78; 219/121.79; 219/121.82; 219/121.81; 219/121.83
(58) Field of Search .................... 219/121.71, 121.62, 219/121.66, 121.72, 121.78, 121.79, 121.82, 121.81, 121.83

(56) References Cited

U.S. PATENT DOCUMENTS

| | | | |
|---|---|---|---|
| 4,673,795 | * 6/1987 | Ortiz, Jr. ..................... | 219/121 L |
| 4,873,414 | * 10/1989 | Ma et al. ..................... | 219/121.7 |
| 5,011,626 | * 4/1991 | Ma et al. ..................... | 252/582 |
| 5,026,964 | 6/1991 | Somers et al. .................. | 219/121.7 |
| 5,697,120 | * 12/1997 | Robinson ..................... | 15/321 |
| 5,698,120 | * 12/1997 | Kurosawa et al. ............... | 219/121.62 |
| 5,798,524 | * 8/1998 | Kundmann et al. .............. | 250/305 |
| 5,811,754 | * 9/1998 | Nakatani et al. ............... | 219/121.83 |
| 5,910,894 | * 6/1999 | Pryor .......................... | 364/468.01 |
| 5,991,015 | * 11/1999 | Zamel et al. ................... | 256/222 |

FOREIGN PATENT DOCUMENTS

| | | |
|---|---|---|
| 0 344 339 | 6/1989 | (EP) . |
| 0937532A1 | * 8/1999 | (EP) . |
| 2 113 592 | 10/1983 | (GB) . |

* cited by examiner

*Primary Examiner*—Patrick Ryan
*Assistant Examiner*—Colleen Cooke
(74) *Attorney, Agent, or Firm*—Buchanan Ingersoll, P.C.

(57) ABSTRACT

The invention provides a method of drilling holes sequentially through a workpiece using a laser gun with a camera positioned axially in-line with the drilling beam of the laser gun. Each image from the camera is analysed by digital image processing techniques to control the positioning of the laser nozzle relative to the workpiece and/or to compensate for errors produced in previously drilled holes. By feedback from the digitally processed images it is possible to repeat the auto-focusing of the laser automatically throughout the drilling of a large number of holes in the same workpiece, to adjust the drilling of subsequent holes in order to bring the hole characteristics closed to a predefined optimum, or to abort work on a particular workpiece if hole diameters exceed a given tolerance range.

6 Claims, 2 Drawing Sheets

LASER DRILLING WITH OPTICAL FEEDBACK

BACKGROUND OF THE INVENTION

1. Field of the Invention

The invention relates to the general field of the use of pulsed lasers as drilling, boring or cutting tools. In such laser machining an accurately focused laser beam is directed against a workpiece so as to vaporize a portion of that workpiece. The invention provides an automated method for drilling a number of holes sequentially through the same workpiece.

2. Description of the Related Art

It is known to provide pulsed YAG lasers of the kind used for hole drilling with in-line cameras, so that the operator can see on a visual display screen an image of the target area of the workpiece before drilling commences and after drilling is complete. The displayed image is purely for the laser operator's benefit. It has, however, been proposed that the positioning of the nozzle of the laser relative to the target area of the workpiece surface can be accurately controlled by a manual adjustment of the laser nozzle relative to the workpiece until the image displayed on the VDU by the in-line camera becomes sharply in focus. Such a manual adjustment is, however, slow and subjective, and other methods of accurately positioning the laser nozzle are generally preferred. One such method involves moving the nozzle until it touches the workpiece, and then moving backwards by a defined distance. That method requires an electrically conductive workpiece surface, so that an electrical signal can be generated to indicate the moment of touching. Another method of rapidly positioning the nozzle relative to the workpiece prior to drilling involves the measurement of the capacitance of the gap between the nozzle and the workpiece. This method is effective and is normally accurate. It is however susceptible to error if the humidity of the air between the nozzle and the workpiece varies significantly, if the workpiece is ceramic-coated (in which case the capacitance measurement automatically includes that of the ceramic coating over the underlying metal surface of the workpiece) or if the nozzle is presented to the workpiece at a particularly low angle of incidence.

The manual adjustment of the position of the laser relative to the workpiece is extremely slow, and is used for initial set-up only. After that initial set-up, the laser is used to drill a very large number of holes in the workpiece (sometimes in excess of 400 accurately placed holes) without a further check on the accuracy of the nozzle position.

This invention contemplates for the first time a rapid and automatic method of determining an accurate spacing between the nozzle and the workpiece prior to drilling. The invention also provides an accurate check on the size and accuracy of each hole as it is drilled, thus enabling the entire drilling cycle of multiple holes to be automated.

BRIEF SUMMARY OF THE INVENTION

The invention provides a method of drilling holes sequentially through a workpiece using a laser gun with a camera positioned axially in-line with the drilling beam of the laser gun, characterized in that each image from the camera is analysed by digital image processing techniques to control the positioning of the laser nozzle relative to the workpiece and/or to compensate for errors produced in previously drilled holes.

In a first embodiment of the invention the camera image is digitally processed using optical auto-focus techniques, and the output from that image processing is used to bring the nozzle of the laser head to a predefined optimum starting position relative to the workpiece. For example, the contrast between individual grains of the surface crystal structure of the workpiece can be used to control the auto-focussing of the camera by the movement of the nozzle towards and away from the workpiece.

In another embodiment, the digital image processing techniques are used after the drilling of each hole to compare parameters of the drilled hole, such as its size and circularity, with a computer simulation of a preferred drilled hole, or with permitted predefined tolerances for the drilled hole, and the drilling of the next hole in the sequence is modified as a consequence of that comparison. For example, the above feedback may include the step of aborting all further work on a given workpiece if the comparison shows that the last completed drilled hole is outside the prescribed permitted tolerances. If the last completed drilled hole is within the prescribed permitted tolerances but the hole characteristics still deviate from those prescribed for the optimum desired drilled hole, then the feedback preferably includes the step of modifying the drilling characteristics of the next hole to be drilled in the sequence, to make that next drilled hole a better match for the prescribed optimum drilled hole parameters.

DETAILED DESCRIPTION OF THE INVENTION

Figure 1:
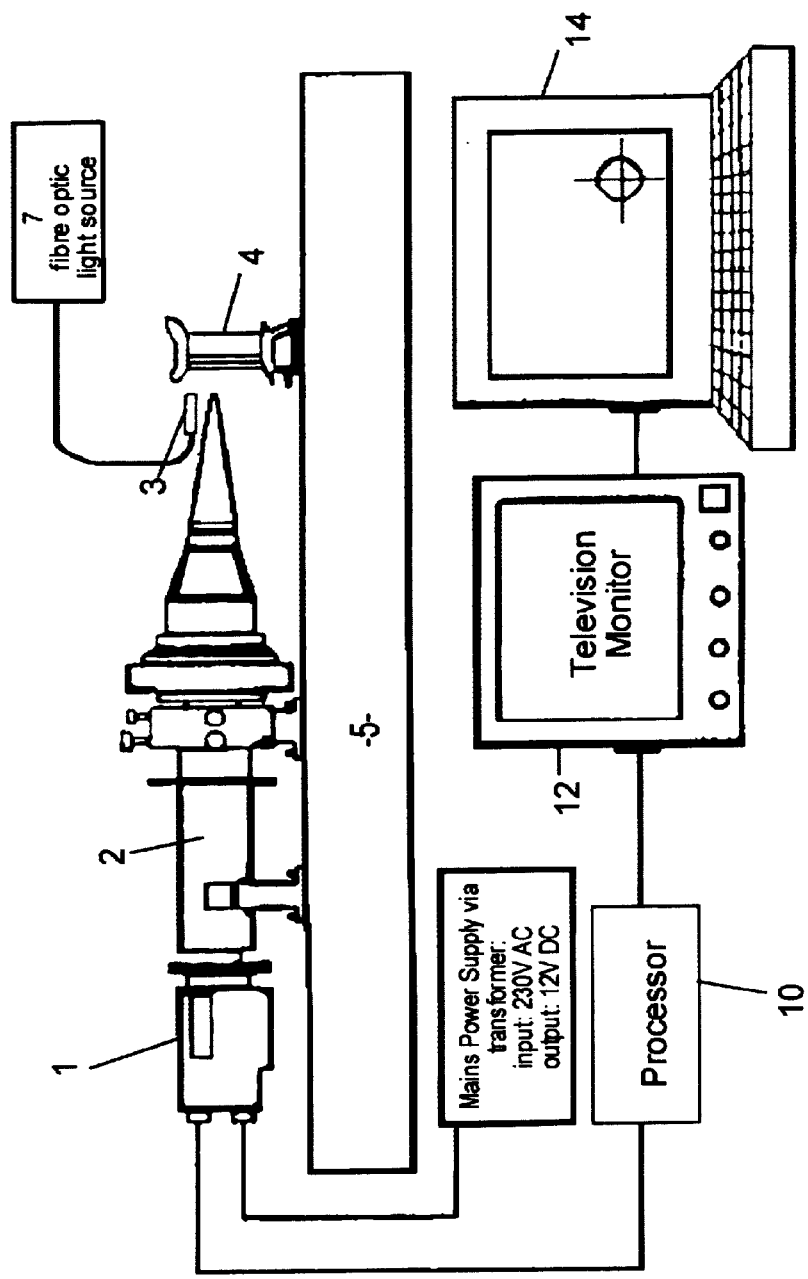
FIG. 1 is a general arrangement drawing for a laser drilling machine organized to drill in accordance with the method of the invention.
Figure 2:
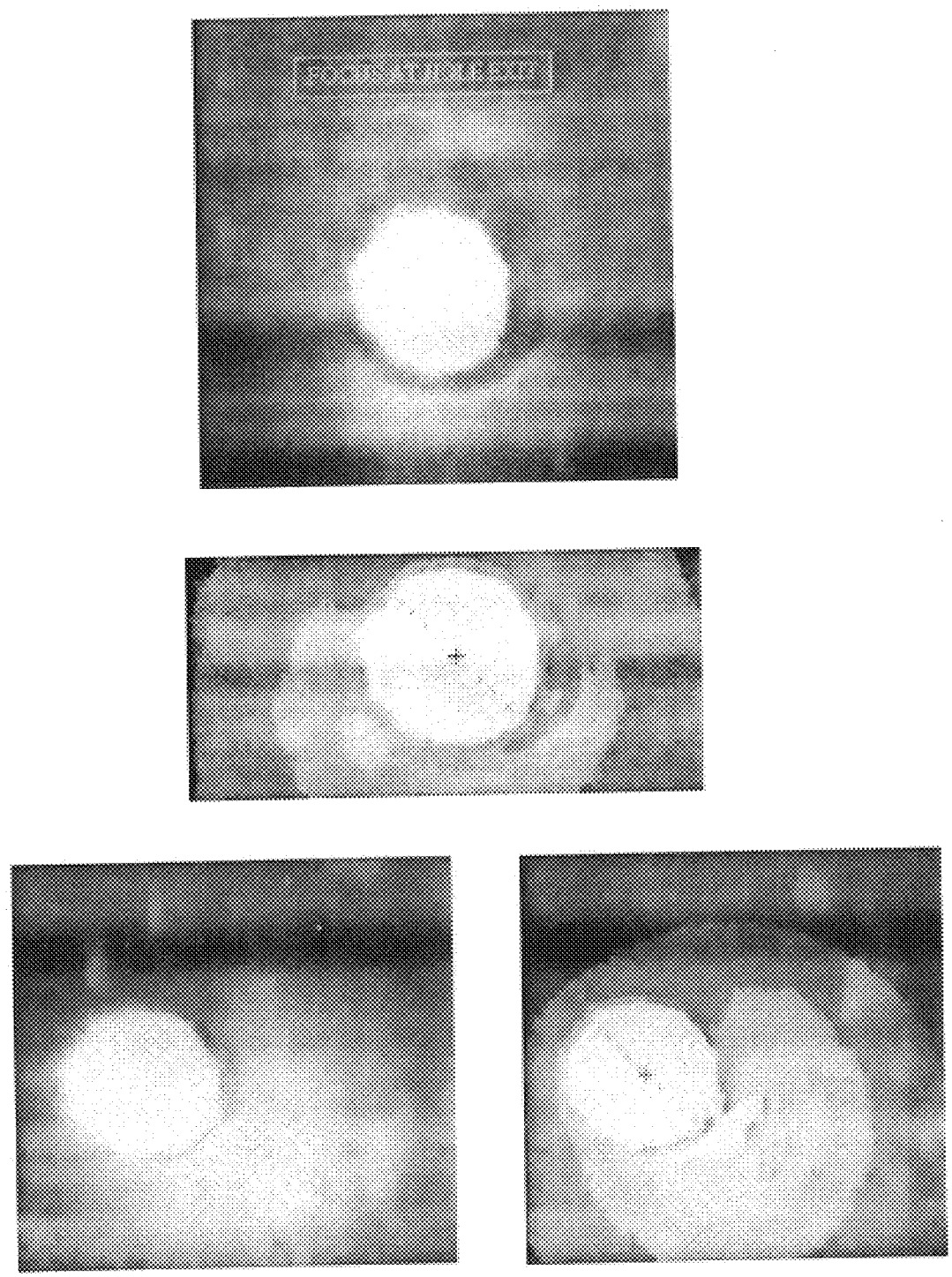
FIG. 2 is a series of four images of holes each of which has been drilled by the laser of FIG. 1.

In FIG. 1, the apparatus needed to carry out the method of the invention can be summarized as comprising a laser 2 with an in-line camera 1 mounted in position. The camera 1 is focused on the workpiece through a 45° one-way YAG mirror which reflects the laser beam onto the workpiece but allows an image of the target zone on the workpiece to be transmitted through the mirror without reflection for capture by the camera. The laser is shown focussed on a workpiece 4, with the zone of cutting being illuminated by a fibre optic illumination lamp 3 powered by a fibre optic light source 7.

The entire cutting apparatus sits securely on a bed 5 which also supports the workpiece 4. An in-line camera 1, aligned to look directly along the axis of the laser 2 and through the nozzle 3, has in the past been used simply as a focusing aid for the manual focusing of the laser onto the workpiece. In accordance with the invention, however, the in-line camera 1 sends its data through a processor 10 to a monitor screen 12 and/or a personal computer 14.

On initial set-up, the camera uses known optical auto-focusing techniques involving digital image processing to move the nozzle relative to the workpiece until perfect focus has been achieved. Using modern rapid techniques, this refocusing of the laser can be repeated periodically throughout the drilling of a large number of holes. Indeed it is feasible that the automatic refocusing could take place after each hole drilled, although in practice it is likely to be sufficient to drill a number of holes in succession before reinitiating the auto-focus process.

At the completion of drilling of each hole, the same optical camera using digital image processing techniques can provide digital data to the controlling processor to permit an assessment of the accuracy of the drilled hole. Parameters such as diameter and circularity of the hole can be monitored, and optionally by using "best fit" digital processing techniques the characteristics of the drilled hole can be compared with those of an optimum desired drilled hole. Alternatively or in addition, the deviation of the characteristics of the drilled hole from those of the optimum desired drilled hole can be compared with permitted tolerances, and the drilling of the next hole in the sequence modified as a consequence of the different comparisons. For example, if the first comparison shows that the drilled hole is marginally smaller than the optimum desired drilled hole, then the next hole in the sequence can be drilled slightly larger. If the drilled hole being examined is found to be beyond the permitted tolerances, then the entire drilling sequence of holes in that particular workpiece may be automatically aborted.

The use of digital image processing techniques as outlined above permits a spectacular improvement in the efficiency and speed of drilling of multiple holes through a workpiece, and represents a massive increase in the efficiency and accuracy of the drilling process.

What is claimed is:

1. A method of drilling holes sequentially through a workpiece using a laser gun with a camera positioned axially in-line with the drilling beam of the laser gun, wherein each image from the camera is analysed by digital image processing techniques to control the positioning of the laser nozzle relative to the workpiece and to compensate for errors produced in previously drilled holes.

2. A method according to claim 1, wherein the zone of interaction between the laser beam and the workpiece is illuminated by means of a fibre-optic light source, for observation by the camera.

3. A method according to claim 1, wherein each image from the camera is digitally processed using optical auto-focus techniques, and the output from that image processing is used to bring a nozzle of the laser head to a predefined optimum starting position relative to the workpiece.

4. A method according to claim 3, wherein the automatic refocusing of the laser is repeated periodically throughout the drilling of a large number of holes in a workpiece.

5. A method according to claim 1, wherein each image from the camera is subjected to a digital image processing technique to compare the drilled hole with the optimum desired drilled hole or with permitted tolerances for the drilled hole; and the drilling of the next hole in the sequence is modified as a consequence of that comparison.

6. A method according to claim 5, wherein the feedback includes the step of aborting all work on that workpiece if the comparison shows that the last completed drilled hole is outside of the prescribed permitted tolerances.

* * * * *